United States Patent [19]

Gracie

[11] Patent Number: 5,622,344
[45] Date of Patent: Apr. 22, 1997

[54] COLLAPSIBLE TRIPOD STAND

[76] Inventor: John D. Gracie, 7013 Pomelo Dr., West Hills, Calif. 90317

[21] Appl. No.: 381,416

[22] Filed: Jan. 31, 1995

[51] Int. Cl.$^6$ .................................................. F16M 11/38
[52] U.S. Cl. .................. 248/171; 248/125.8; 248/166; 248/411; 248/520; 84/327
[58] Field of Search .................................. 248/411, 413, 248/171, 170, 169, 125.1, 125.8, 520, 441.1, 371, 158, 166, 398; 84/327, 280, 278

[56] References Cited

U.S. PATENT DOCUMENTS

| | | | |
|---|---|---|---|
| 751,140 | 2/1904 | Beecroft | 248/125.8 |
| 1,045,583 | 11/1912 | Mills | 84/327 |
| 1,612,148 | 12/1926 | Oettinger. | |
| 2,272,490 | 2/1942 | Waechter | 248/171 |
| 2,547,924 | 4/1951 | Citro | 84/327 |
| 2,613,901 | 10/1952 | Tatar | 248/171 |
| 2,646,956 | 7/1953 | Cadwell et al. | 248/170 |
| 2,750,141 | 6/1956 | Tobias | 248/171 |
| 2,795,387 | 6/1957 | Elsey | 248/46 |
| 3,697,031 | 10/1972 | Glickman et al. | 248/171 |
| 4,355,779 | 10/1982 | Heled | 248/460 |
| 4,366,940 | 1/1983 | Vargas | 248/542 |
| 4,381,690 | 5/1983 | Kimble | 248/171 |
| 4,541,596 | 9/1985 | Price | 248/125 |
| 4,742,751 | 5/1988 | Cherry | 84/327 |
| 4,813,644 | 3/1989 | Goldner | 248/441.1 |
| 4,993,635 | 2/1991 | Dupre | 248/166 X |
| 5,062,606 | 11/1991 | Hoshino | 248/171 |
| 5,202,527 | 4/1993 | Gracie | 84/327 |

*Primary Examiner*—Korie Chan
*Assistant Examiner*—Anita M. King
*Attorney, Agent, or Firm*—Jack C. Munro

[57] ABSTRACT

A collapsible tripod stand for supporting an instrument in a spaced position above a supporting surface. The collapsible tripod stand will normally have a slanted main supporting member which has an upper end upon which is to be mounted the instrument and a lower end which is to be located against the supporting surface. Mounted to the main supporting member are a pair of legs which are angularly disposed relative to each other when such extend transversely to the main supporting member and are in contact the supporting surface. Each of the legs is connected by links to a middle clamp band mounted on the main supporting member with this middle clamp band being slidably movable thereon. Movement of the middle clamp band is capable of locating the legs in numerous transverse positions relative to the main supporting member or when in the collapsed position the legs are located alongside and substantially parallel to the main supporting member.

7 Claims, 3 Drawing Sheets

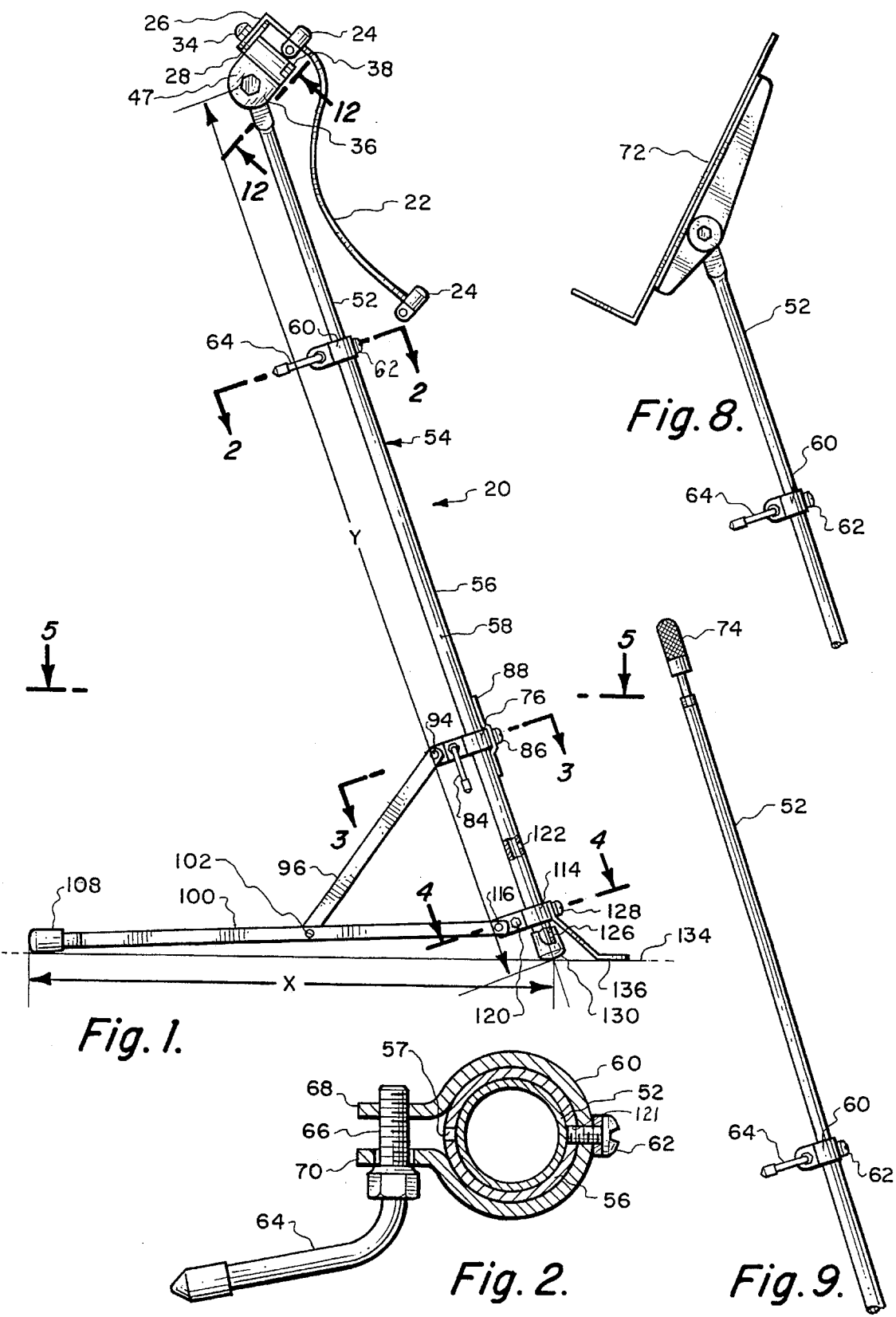

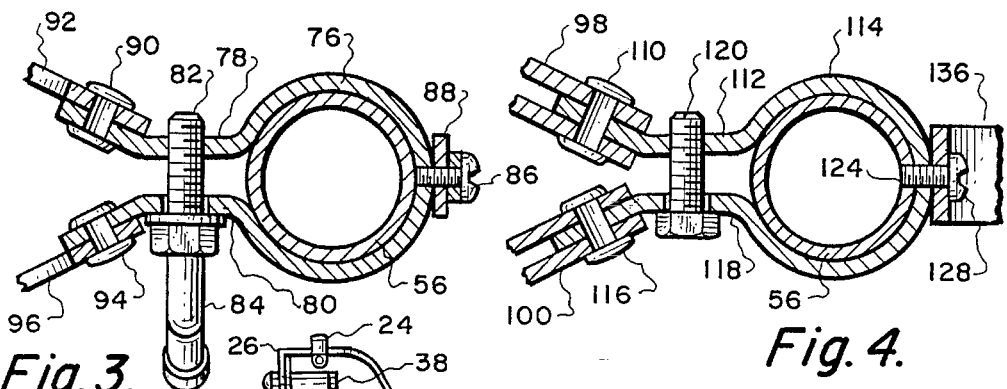
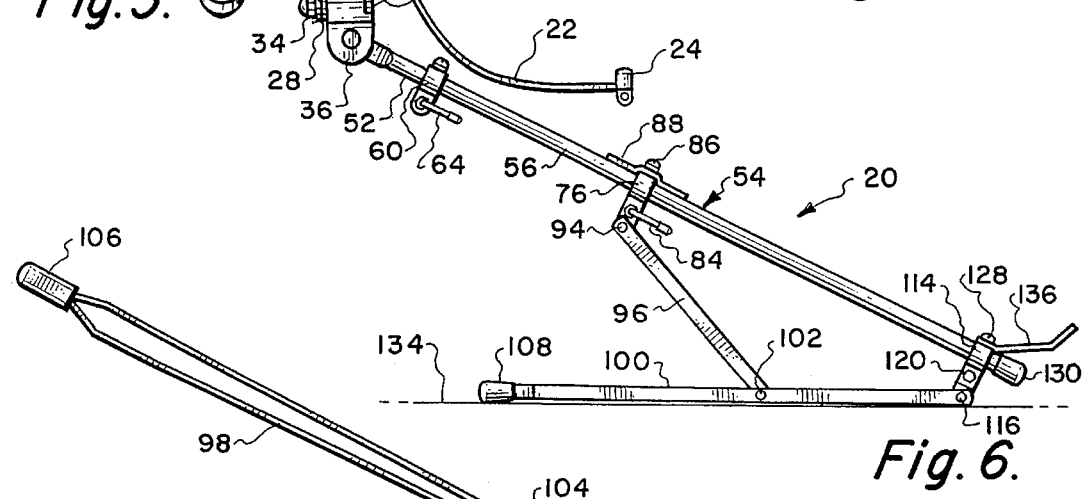
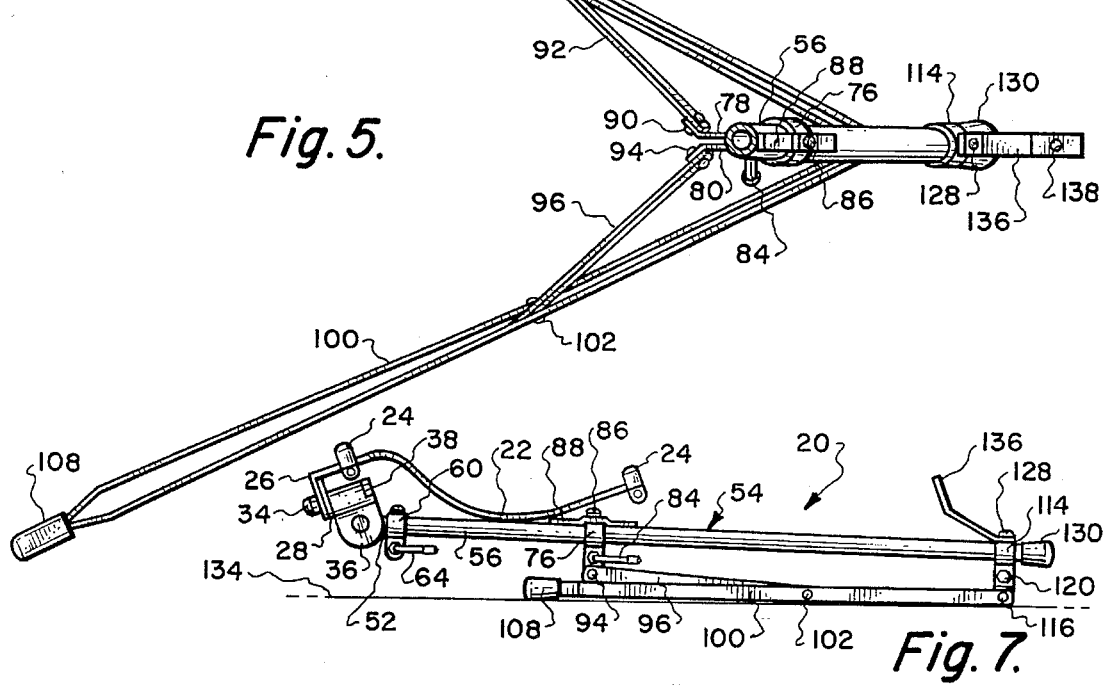

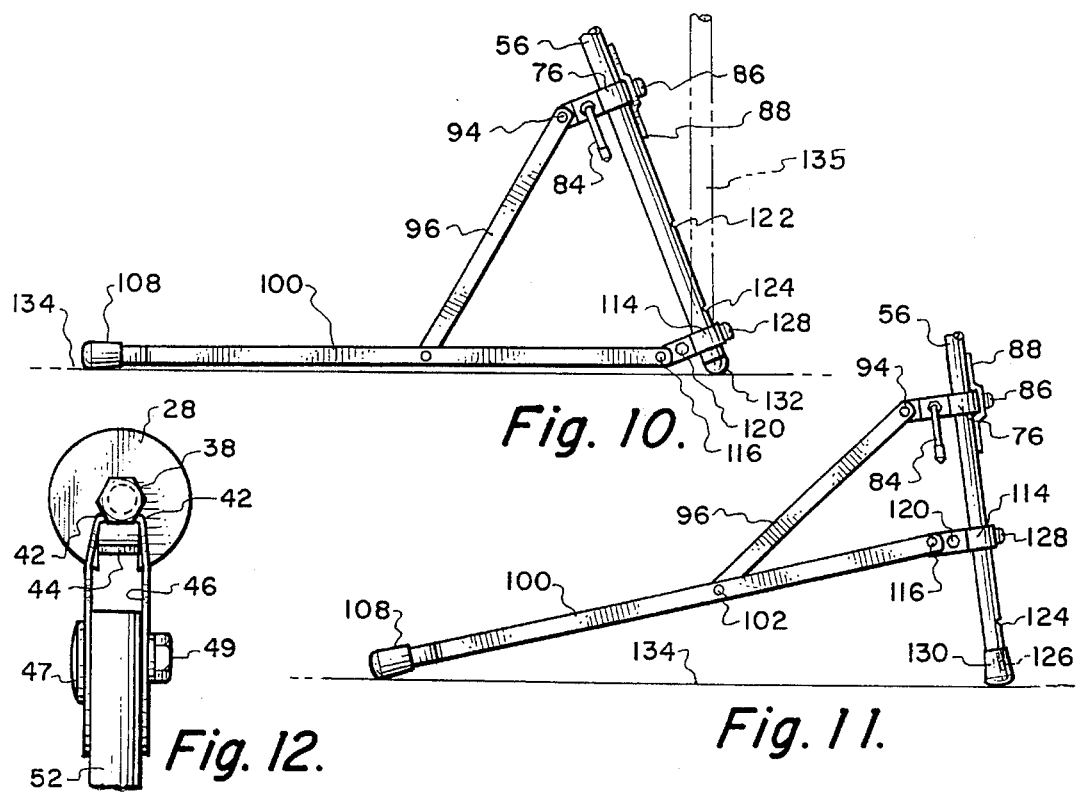
Fig. 10.
Fig. 11.
Fig. 12.
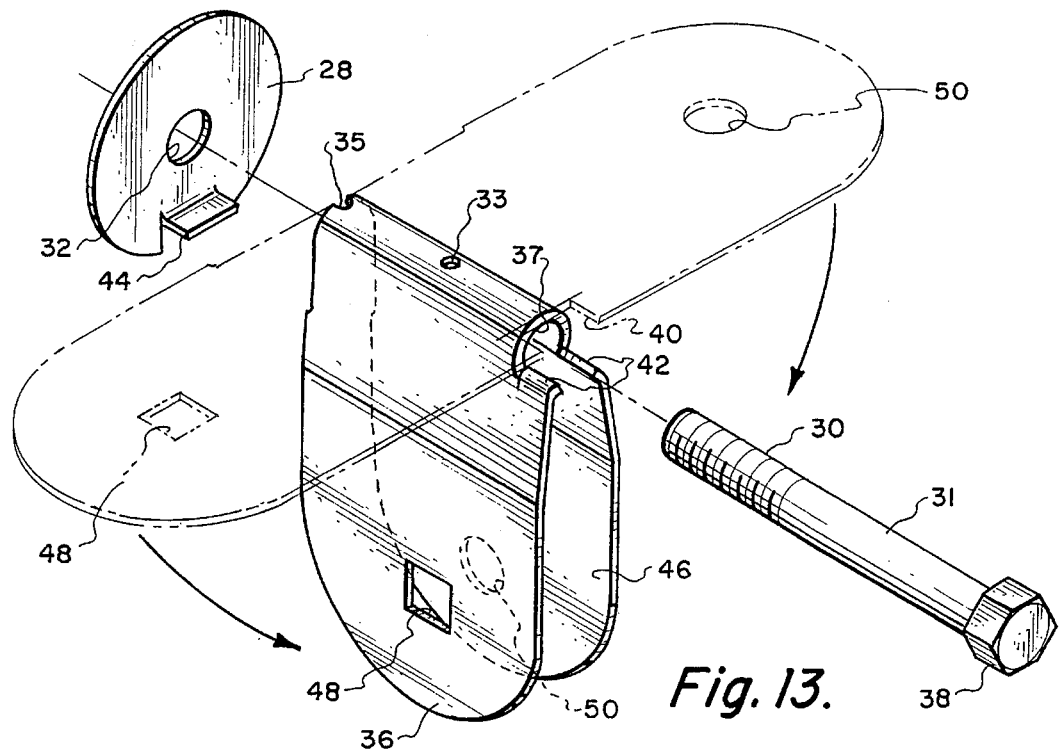
Fig. 13.

COLLAPSIBLE TRIPOD STAND

BACKGROUND OF THE INVENTION

1. Field of the Invention

The field of this invention relates to stanchions or stands which are designed to support a piece of equipment in a spaced position above a supporting surface such as a floor or ground.

2. Description of the Prior Art

Stands are in extremely common use and are used to support equipment such as musical instruments, cameras, surveyors levels, telescopes, lighting equipment, microphones, intravenous containers, just to name a few usages for such stands. Most stands are designed to support the equipment in a directly vertical position which means that the main supporting member of the stand is always located perpendicular to the supporting surface. For some objects that are being supported, it would be more preferable to not have a vertical main supporting member. Examples of such equipment would be for an intravenous container where it is desired to have the container located directly above the patient with the main supporting member of the stand being located in a slanted configuration so as to not interfere with the body of the patient. Such slanting of the main supporting member is desirable also in conjunction with musical instruments where the stand is used to support sheet music. With the main supporting member being slanted away from the musician, this provides space for the legs of the musician, peg room for the cellist, slide room for the trombonist, and so forth, who normally is in a seated position directly adjacent the stand. Also, when the stand is used to support a microphone, a vertical main supporting member of the stand causes the base section of the stand to interfere with the feet of the microphone user. Again, by having a slanted main supporting member, the base section of the stand is spaced from the user so as not to interfere with the user.

Further, for some applications, users, such as photographers and animated musicians, may wish the stand to function temporarily as a unipod. Stands of the prior art have not been able to accommodate this type of movement.

Also, stands of the prior art are designed primarily to be used on level floors or level ground. When the supporting surface is not level, such stands of the prior art frequently become unstable and are subject to overturning. In order to accommodate unlevel surfaces, some of the stands of the prior art have been equipped with extendable legs so as to enable adjustment of the stand to assume a vertical position even when located on an unlevel surface. However, such extendable legs increase the complexity of the stand thereby increasing the cost of manufacture and also require additional setup steps for the stand when used on an unlevel surface.

SUMMARY OF THE INVENTION

A collapsible tripod stand which includes a main supporting member which has an upper end and a lower end. Equipment that is to be supported is to be mounted on the upper end and at the lower end is mounted a pair of legs angularly disposed relative to each other with the legs adapted to rest on a supporting surface. The legs form two points of connection with the supporting surface with the lower end of the main supporting member forming a third point of connection with the supporting surface. The main supporting member can be located vertical or in a slanted position relative to the supporting surface. The legs are pivotable relative to the main supporting member between a collapsed position located alongside the main supporting member to an extended position located radially to the main supporting member. The legs can be located in various radial positions thereby locating the main supporting member vertical to the supporting surface or in various slanted positions. Equipment is connected to the main supporting member by a tilter head assembly which is formed of a U-shaped plate which connects with a bolt fastener and an enlarged bent-tab washer. The washer forms a friction surface with the structure that supports the equipment permitting manual adjusting of the equipment to different positions but when released in a particular position will remain in that position.

One of the primary objectives of the present invention is to construct a stand which is extremely versatile and usable with a wide range of different pieces of equipment and is usable not only on level supporting surfaces but also on non-level supporting surfaces and uneven supporting surfaces such as a gravel or dirt surface.

Another objective of the present invention is to construct a stand which can be manufactured of a relatively low cost and thereby sold to the ultimate consumer (user) at a relatively low cost.

Another objective of the present invention is to construct a stand that is usable by singers, musicians, photographers, homeowners, medical personnel as well as numerous others.

Another objective of the present invention is to construct a stand which can be readily set up, or moved to a collapsed position thereby occupying a small amount of space when not being used.

BRIEF DESCRIPTION OF THE DRAWINGS

FIG. 1 is a side elevational view of the stand of the present invention showing the stand in a typical usage position with the main supporting member located in a somewhat upright though slanted position;

FIG. 2 is a cross-sectional view through a first clamp band mounted on the main supporting member taken along line 2—2 of FIG. 1 which is used to permit telescoping adjustment of the main supporting member and fixing of the telescopic members in a fixed position;

FIG. 3 is a cross-sectional view through a second clamp band which is mounted on the main supporting member which is used to cause the legs of the stand to be moved between a collapsed position and an extended position;

FIG. 4 a cross-sectional view through a third clamp band which connects the legs to the main supporting member taken along line 4—4 of FIG. 1;

FIG. 5 is a cross-sectional view taken along line 5—5 of FIG. 1 providing a top view of the legs utilized in conjunction with the stand of the present invention;

FIG. 6 is a side elevational view similar to FIG. 1 but showing the main supporting member of the stand in a much greater slanted position relative to the supporting surface;

FIG. 7 is a side elevational view of the stand of the present invention showing the stand in the collapsed position;

FIG. 8 is a side elevational view of the stand of the present invention showing the stand being connected with a shelf adapted to support sheet music;

FIG. 9 is a side elevational view of the stand of the present invention showing the stand being used to support a microphone;

FIG. 10 is a side elevational view of the lower portion of the stand of FIG. 1 but showing the third clamping band being moved to a lower position permitting locating of the legs flush against the supporting surface;

FIG. 11 is a view similar to FIG. 10 but showing the third clamping band being moved to an upper position and the legs located in a substantially inclined position relative to the supporting surface with this position of the stand to be used on uneven terrain;

FIG. 12 is a cross-sectional view through the tilter head that is used/to support the equipment at the upper end of the main supporting member of the stand of the present invention taken along line 12—12 of FIG. 1; and FIG. 13 is an exploded isometric view of the tilter head utilized in conjunction with the stand of the present invention.

DETAILED DESCRIPTION OF THE PREFERRED EMBODIMENT

Referring particularly to the drawings there is shown in FIG. 1 the stand 20 of this invention. A piece of equipment such as a guitar (not shown) is to be locked within a saddle 22. A similar type of saddle 22 is shown and described within U.S. Pat. No. 5,202,527, issued Apr. 13, 1993, entitled guitar stanchion by the present inventor. Saddle 22 includes locking members 24 which are to lock onto the body of the guitar. The outer end of the saddle 22 is formed into a right-angled flange 26. The flange 26 is basically in the shape of a thin plate the inner surface of which is to abut against washer 28 of the tilter head assembly. Flange 26 includes a central hole (not shown) through which is to be conducted the threaded end 30 of a bolt fastener. This threaded end 30 also passes through hole 32 of washer 28. A lock nut 34 is to be tightened on the threaded end 30 and abut against the outside surface of the flange 26. The tightening of the lock nut 34 is to be sufficient so that a frictional fit is established between the inner surface of the flange 26 and the washer 28. This frictional fit is to be so the saddle 22 can be manually pivoted relative to the washer 28 but when left unattended, the saddle 22 will remain in its established position. The purpose for this is so that the saddle 22, and hence the guitar, can be canted at a particularly desired angle for the user. For a more complete discussion of this canting of the guitar, reference is to be had to the aforementioned U.S. Pat. No. 5,202,527.

The tilter head assembly, which includes bolt fastener 31 with threaded end 30, located within the apex section 37 of a U-shaped plate 36. The head 38 of the bolt fastener 31 is mounted within cut-out section 40 of the U-shaped plate 36. The side edges of the cut-out section 40 are inwardly flared forming locking tabs 42. These locking tabs 42 connect with the polygonal shaped head 38 of the bolt fastener 31 preventing rotation of the bolt fastener 31 relative to the U-shaped plate 36. The washer 28 includes a bent tab 44 which is located in a close confining manner within the confines of the space 46 located between the opposing legs of the U-shaped plate 36. The bent tab 44 prevents the washer 28 from pivoting relative to the U-shaped plate 36. If desired, brazing can be applied to holes 33 and 35 which would weld in place bolt fastener 31 to the U-shaped plate 36. Brazing applied to hole 35 also welds in place washer 28.

The opposing legs of the U-shaped plate 36 includes aligned holes 48 and 50. Hole 48 is shown to be of a square configuration with hole 50 to be shown to be circular. A carriage bolt fastener having a squared section, located against head 47 and lock nut 49 is to be conducted through holes 48 and 50 and also simultaneously conducted through top tube 52 of the main supporting member 54. The squared section of head 47 of the fastener is to be captured by the rectangularly shaped hole 48 and thereby be prevented from rotation. The lock nut 49 is to be placed in conjunction with the fastener and located directly adjacent hole 50. This lock nut 49 is to be tightened sufficiently so as to again establish a snug fit between the U-shaped plate 36 and the top tube 52.

Pivotal movement of approximately one hundred eighty plus degrees is permitted of the U-shaped plate 36 of the tilter head assembly relative to the top tube 52. Again, this provides a degree of adjustment for the user according to individual desires with a similar type of adjustment being described within U.S. Pat. No. 5,202,527.

The top tube 52 is telescopingly received within a bottom tube 56. The main supporting member 54, composed in part of top tube 52 and bottom tube 56, has a longitudinal center axis 58. Mounted on the main supporting member 54 is an upper clamp band 60 which is to be located at the area of slit 57 of the uppermost end of the bottom tube 56. A screw 62 is conducted through the upper clamp band 60 and in through an indexing hole 121 formed in the bottom tube 56 thereby locking in place the position of the upper clamp band 60. Normally, the top tube 52 is capable of free sliding movement within the bottom tube 56. The upper clamp band 60 is squeezed by manually turning handle 64 of threaded fastener 66 which is conducted through flared ends 68 and 70 of the upper clamp band 60 thereby tightening of upper clamp band 60 onto the slitted upper end of bottom tube 56 which binds the area of slit 57 of bottom tube 56 up against the top tube 52 thereby locking in place the tubes 52 and 56. Loosening of the threaded fasteners 66 by means of handle 64 will, again, permit the top tube 52 to be slid from the extended position shown in FIG. 1 to the totally retracted position shown in FIG. 7. An intermediate retracted position is shown in FIG. 6.

It is to be understood that instead of the saddle 22 there could be mounted on the top tube 52 other types of equipment holding structures such as the sheet music shelf 72 which is designed to hold sheet music which is shown in FIG. 8 or a microphone 74 shown in FIG. 9.

Mounted on the bottom tube 56 is a middle clamp band 76. The middle clamp band 76 has flared ends 78 and 80 which are connected together by the threaded end 82 of a bolt fastener which is to be manually turned by means of handle 84. The middle clamp band 76 has threaded thereon a screw 86 which connects with clamp guide 88. The middle clamp band 76 is to be slidingly movable on the bottom tube 56 as long as the threaded fastener 82 is sufficiently loosened. To keep the middle clamp band 76 from slightly tilting and digging into the wall surface of the bottom tube 56, the clamp guide 88 slides along the bottom tube 56 and prevents this tilting from occurring. Once a desired longitudinal position is achieved of the middle clamp band 76 on the bottom tube 56, the handle 84 is to be pivoted which will result in fixing of the position of the middle clamp band 76 on the bottom tube 56. The surface of clamp guide 88 that abuts bottom tube 56 is to be coated with a felt pad to prevent damage to the surface of bottom tube 56.

Flared end 78 is pivotably connected by means of a pivot pin 90 to a link 92. Flared end 80 is pivotably connected by means of a pivot pin 94 to a link 96. Pivot pin 90 is connected to the upper end of the link 92 with pivot pin 94 being connected to the upper end of the link 96. The lower end of the link 92 is pivotably connected to leg 98 with the lower end of link 96 being pivotably connected to leg 100. The pivotal connection between link 96 and leg 100 is provided by means of a pivot pin 102 with the pivotal connection between the leg 98 and the link 92 being provided by pivot pin 104. The outer end of the leg 98 terminates in a resilient foot 106 with the outer end of the leg 100 terminating in a resilient foot 108.

The inner end of the leg 98 is pivotably connected by means of a pivot pin 110 to flared end 112 of a lower clamp band 114. The inner end of the leg 100 is pivotably connected by means of a pivot pin 116 to the flared end 118 of the lower clamp band 114. Connected between the flared ends 112 and 118 is a bolt fastener 120. Tightening of bolt fastener 120 secures the position of the lower clamp band 114 on the bottom tube 56. Sliding movement of the middle clamp band 76 will cause the legs 98 and 100 to be moved from the parallel position alongside the main supporting member 54, as shown in FIG. 7, to a partially open position, shown in FIG. 6, and further to the totally open position shown in FIG. 1 where the legs 98 and 100 are almost perpendicular to the main supporting member 54. When the particular desired position is obtained for the middle clamp band 76, the handle 84 is tightened and the middle clamp band 76 fixed in position.

The lower clamp band 114 can be adjusted to different longitudinal positions on the bottom tube 56. One position is the upper position provided by indexing hole 122, intermediate position provided by indexing hole 124 and a lower position provided by indexing hole 126. Mounted within the lower clamp band 114 is a screw 128. The screw 128 functions as a locator screw to establish either the upper position provided by indexing hole 122, the intermediate position provided by hole 124, or the lower position provided by indexing hole 126. The screw 128 is shown connecting with indexing hole 124 in FIG. 1, indexing hole 126 in FIG. 10 and indexing hole 122 in FIG. 11. Foot pad 130 is removed and replaced by resilient plug 132 which is inserted within the open lower end of the bottom tube 56 when screw 128 connects with indexing hole 126. The resilient plug 132 is to rest against the supporting surface 134. When in this lower position, the legs 98 and 100 rest substantially flush against the supporting surface 134 with the main supporting member 54 capable of assuming the slanted position shown in FIG. 10 or even in a vertically upright position shown by dotted lines 135. This particular position of the legs 98 and 100 would normally be preferred if the stand 20 of this invention is being utilized to support an intravenous container with the legs 98 and 100 to be possibly located underneath the body of a human or under a board on which the human is supported.

The intermediate position provided by indexing hole 124 is shown in FIGS. 1, 6 and 7. This would be the commonly used position and provides three points of contact with the supporting surface provided by foot pads 106, 108 and 130. If the stand 20 is being utilized on an uneven or irregular supporting surface 134, then it may be desirable to locate the screw 128 in conjunction with indexing hole 122 which is shown in FIG. 11 of the drawings. This displaces the legs 98 and 100 in a spaced position above the supporting surface 134 and over any undesirable irregularities in the supporting surface 134.

It has been found in most instances that the length of the legs 98 and 100, which is shown in FIG. 1, to be distance X should be about forty percent of the maximum length of the main supporting member which is shown to be distance Y. However, if the main supporting member 54 is of a greater length, or if located at a shallow angle relative to horizontal, then possibly tipping of the stand 20 could occur especially if a heavy weight instrument is connected to the top of the top tube 52. In such a situation it may be desirable to utilize brace 136 which is secured to the lower clamp band 114 by means of screw 128. The brace 136 is shaped so that a portion of it will rest flush against the supporting surface 134. The brace 136 can then be secured to the surface by means of a screw (not shown) which is to pass through hole 138 formed in the brace 136 and penetrate the supporting surface 134. This type of securement will clearly prevent tipping of the stand 20. Instead of applying a screw through the hole 138, there actually may be utilized a heavy weighted object that is placed on the brace 136 holding such tightly in conjunction with the supporting surface 134.

What is claimed is:

1. A collapsible tripod stand having three legs to be located on a supporting surface comprising:

a main supporting member having a sidewall extending between an upper end and a lower end, equipment connecting means mounted on said upper end adapted for connection with and to support a piece of equipment, said lower end adapted to rest against the supporting surface;

a first leg of said three legs comprising an elongated member having a first inner end and a first outer end, a second leg of said three legs comprising an elongated member having a second inner end and a second outer end, said first outer end and said second outer end being pivotally mounted on a lower clamp band which is mounted on said main supporting member at said lower end, both said first leg and said second leg being pivotable on said lower clamp band between an extended position and a collapsed position, both said first leg and said second leg being located transverse to said main supporting member when in said extended position with said first outer end being spaced from said second outer end, said first and second legs being angularly disposed relative to each other when in said extended position, said main supporting member and said first leg and said second leg combining to form said three legs of said tripod stand;

a middle clamp band mounted on said main supporting member, said middle clamp band comprising a single unit, said middle clamp band being movable on said main supporting member between a plurality of positions, said middle clamp band being fixable on said main supporting member at any one of said positions; and a first link pivotally connecting said first leg to said middle clamp band, a second link pivotally connecting said second leg to said middle clamp band, said first link being pivotally connected to said first leg, said second link being pivotally connected to said second leg, movement of said middle clamp band between said plurality of positions will cause said first leg and said second leg to be located either in a selected said extended position or in said collapsed position, said collapsed position locates said first leg and said second leg substantially parallel to and against said main supporting member with said first outer end and said second outer end being located between said lower clamp band and said equipment connecting means.

2. The collapsible tripod stand as defined in claim 1 wherein:

said lower clamp band being slidably mounted on said main supporting member, said lower clamp band being adjustable to various longitudinal positions on said main supporting member and being fixable in each location of said various positions, movement of said lower clamp band between said various positions will result in locating of said first leg and said second leg from a position substantially flush with the supporting surface to angular positions relative to the supporting surface with said first outer end and said second outer end resting on the supporting surface which form a tripod supporting arrangement with said lower end of said main supporting member also resting on the supporting surface.

3. A collapsible tripod stand as defined in claim 1 wherein:

said first leg being the same length as said second leg, the length of said first leg and said second leg being approximately forty percent of the maximum length of said main supporting member.

4. A collapsible tripod stand as defined in claim 1 wherein:

said first leg being capable of forming approximately a sixty-six degree angle relative to said second leg when said first leg and said second leg are in said extended position.

5. A collapsible tripod stand as defined in claim 1 wherein:

a brace mounted on said main supporting member at said lower end, said brace for attachment to a supporting surface, whereby a weighted object is to be placable in contact with said brace thereby preventing tipping of said collapsible tripod stand.

6. A collapsible tripod stand as defined in claim 1 wherein:

movement of said middle clamp band on said main supporting member permits locating of said main supporting member in any one of various slanted positions relative to the supporting surface as well as a precisely perpendicular position relative to the supporting surface.

7. A collapsible tripod stand as defined in claim 1 wherein:

said equipment connecting means comprising a tilter head assembly, said tilter head assembly being adjustably mounted on said main supporting member, said equipment connecting means establishing a frictional engaging surface with said tilter head assembly, said equipment connecting means is capable of being moved relative to said tilter head assembly to any one of several positions inclined to said main supporting member and because of the frictional engagement of said frictional engaging surface said equipment connecting means will remain in the selected position until it is manually moved therefrom.

* * * * *